(12) United States Patent
Kaga

(10) Patent No.: US 7,422,325 B2
(45) Date of Patent: Sep. 9, 2008

(54) METHOD OF DESIGNING A SPECTACLE LENS

(75) Inventor: Tadashi Kaga, Minowa-machi (JP)

(73) Assignee: Seiko Epson Corporation, Tokyo (JP)

( * ) Notice: Subject to any disclaimer, the term of this patent is extended or adjusted under 35 U.S.C. 154(b) by 220 days.

(21) Appl. No.: 11/344,002

(22) Filed: Feb. 1, 2006

(65) Prior Publication Data
US 2006/0176446 A1   Aug. 10, 2006

(30) Foreign Application Priority Data
Feb. 4, 2005  (JP) ............................. 2005-028572

(51) Int. Cl.
G02C 7/02 (2006.01)
G02C 7/06 (2006.01)
(52) U.S. Cl. ................... 351/177; 351/169; 351/176
(58) Field of Classification Search ............... 351/169, 351/176, 177
See application file for complete search history.

(56) References Cited

U.S. PATENT DOCUMENTS

| | | | |
|---|---|---|---|
| 6,019,470 A | 2/2000 | Mikaiyama et al. | |
| 6,220,704 B1 | 4/2001 | Mukaiyama et al. | |
| 2005/0052615 A1* | 3/2005 | Wang et al. | 351/168 |
| 2005/0157254 A1* | 7/2005 | Shinohara et al. | 351/158 |
| 2005/0157258 A1* | 7/2005 | Shinohara et al. | 351/177 |
| 2005/0254007 A1* | 11/2005 | Wang et al. | 351/177 |

FOREIGN PATENT DOCUMENTS

| | | |
|---|---|---|
| EP | 0 809 126 A1 | 11/1997 |
| EP | 1 004 918 A1 | 5/2000 |
| EP | 1 400 833 A1 | 3/2004 |
| JP | 2-39768 B2 | 9/1990 |
| JP | 2000-66148 A | 3/2000 |
| WO | WO 97/19382 A1 | 5/1997 |

* cited by examiner

*Primary Examiner*—Jordan M Schwartz
(74) *Attorney, Agent, or Firm*—Sughrue Mion, PLLC

(57) ABSTRACT

A method of designing a spectacle lens having a combined refracting surface in at least one of two refracting surfaces at object and eye sides structuring the spectacle lens, wherein the combined refracting surface has an astigmatic refracting surface combined with a progressive refracting surface having a distance-use area, a near-use area different in refractive power from the distance-use area and a progressive area having a refractive power progressively changing between those.

6 Claims, 5 Drawing Sheets

GC: (x, y, z)=(0, 0, 0)

METHOD OF DESIGNING A SPECTACLE LENS

BACKGROUND

1. Technical Field

The present invention relates to a method of designing a progressive power lens for sight correction.

2. Related Art

The progressive power lens has an upper distance-use area for viewing a distance, a lower near-use area different in refractive power from the distance-use area and for seeing a near, and a progressive area having a refractive power progressively changing between those, in at least any one of the two refracting surfaces at the object and eye sides structuring its spectacle lens. Various attempts have been made on the progressive power lens in an effort to improve the optical capability. Attentions are paid for, one of those, a progressive power lens using an aspheric design. This is assumed the same condition as wearing spectacle lenses over the eyes, to compute a dioptric power, astigmatism, prism, etc. by ray tracing, thereby compensating for the regions where errors are to occur in spherical design.

Incidentally, the progressive refracting surface itself is of an aspheric surface because it, in nature, is of a smooth connection between the spherical surfaces for distance and near uses that are different in curvature in one surface. However, the aspheric design of a progressive power lens, referred herein, means not of a navel point in a mathematical sense even in a region where the curvature of a progressive refracting surface is constant such as at a distance-use center or at a near-use center.

The progressive power lens using such aspheric design is disclosed in the below JP-B-2-39768, wherein there are provided effects including astigmatism reduction, lens thickness reduction, etc. as compared to the spherical design. However, the aspheric design described in JP-B-2-39768 is considered far from the optimal aspheric design. For this reason, the present inventor has proposed, in the below JP-A-2000-66148, a spectacle-lens designing method that the optimal aspheric design can be applied throughout the lens including the progressive area by a simple-and-easy lens design.

However, in the designing method proposed in JP-A-2000-66148 by the present inventor, the distance-use and near-use areas of the progressive power lens are designed aspheric due to the consideration that those are regions each having a constant refractive power. Nevertheless, the spectacle lenses actually produced, at nearly 70 percent, are added with astigmatism-correcting refractive powers. It is the current situation that those, in majority, are the spectacle lenses each having a refracting surface provided with a combined refracting surface where progressive and astigmatic refractive surfaces are combined together. The designing method proposed in JP-A-2000-66148 does not take account of a cylindrical power, and hence not optimized in correcting, by an aspheric design, a combined refracting surface where the progressive refracting surface is combined with an astigmatic refracting surface.

SUMMARY

An advantage of some aspects of the invention to provide a spectacle-lens designing method that the optimal aspheric design is to be applied to a combined refracting surface where progressive and astigmatic refracting surfaces are combined together.

According to an aspect of the invention, a method of designing a spectacle lens having a combined refracting surface in at least one of two refracting surfaces at object and eye sides structuring the spectacle lens, the combined refracting surface having an astigmatic refracting surface combined with a progressive refracting surface having a distance-use area, a near-use area different in refractive power from the distance-use area and a progressive area having a refractive power progressively changing between those, the method comprising: establishing reference lines extending in at least two of radial directions from a center point in a vicinity of a geometric center of the spectacle lens, in any one of the distant-use area and the near-use area; establishing reference lines extending in at least one of radial directions from the center point of the spectacle lens, in the other of the distant-use area and the near-use area; determining an aspheric addition amount for a refractive power that is along each of the reference lines; and determining an aspheric addition amount, by interpolation, for a refractive power of between the reference lines.

In a spectacle lens having a combined refracting surface where a progressive refracting surface is combined with an astigmatic refracting surface, the distance-use and near-use areas are made aspheric. The refractive power of the combined refracting surface, at the distance-use and near-use areas, changes depending upon a cylindrical power and cylinder axis, and hence it is not much to say that it differs from spectacle lens to spectacle lens. Because the optimal aspheric addition amount is different depending upon a refractive power of the basic combined refracting surface, there is a need to grasp a refractive power of a basic refracting surface. Therefore, optimal aspheric surface design can be applied to the entire combined refracting surface by establishing a spectacle-lens geometric center or its around as a center point, setting at least two reference lines radially extending from the center point to a region of a broader one of the distance-use and near-use areas and at least one reference line extending to a region of a narrower one of the distance-use and near-use areas, determining an optimal aspheric addition amount for a refractive power of along each of the reference lines, and further determining an aspheric addition amount for a region of between reference lines by interpolation.

It is preferable that the first reference line establishing step is to set up reference lines in at least three directions of from the center point and any one of both ends of the distance-use area and the near-use area and the center region.

In order to correctly grasp a refractive power of the combined refracting surface at broader one of distance-use and near-use areas, reference lines are advantageously set up extending at least in three directions in both ends and center region.

It is preferable that a coordinate system is defined, as viewing the combined refracting surface from front of spectacles being worn, with X-axis in a left-light direction, Y-axis in a vertical direction (distance direction), Z-axis in a depth direction and the center point as (x, y, z)=(0, 0, 0), to represent a coordinate forming a basis of the combined refracting surface as $z_p$ and the aspheric addition amount as $\delta$, then a coordinate $z_t$ of a combined refracting surface added with the aspheric addition amount is expressed as $z_t = z_p + \delta$.

According to the first computation method of an aspheric addition amount, a Z-axis coordinate of an aspheric addition amount can be directly computed.

It is preferable that, provided that a coordinate system is defined, as viewing the combined refracting surface from front of spectacles being worn, with x-axis in a left-light direction, Y-axis in a vertical direction (distance direction), Z-axis in a depth direction and the center point as $(x, y, z) = (0, 0, 0)$, to represent a radial inclination forming a basis of the combined refracting surface as $dz_p$ and a radial inclination determined from the aspheric addition amount as $d\delta$, then a radial inclination $dz_t$ of a combined refracting surface added with the aspheric addition amount is expressed as $dz_t = dz_p + d\delta$.

According to the second computation method of an aspheric addition amount, there is an advantage that prism amount is easy to control because of determining an inclination distribution. A Z-coordinate can be determined by an integration of from the origin.

It is preferable that, provided that a coordinate system is defined, as viewing the combined refracting surface from front of spectacles being worn, with X-axis in a left-light direction, Y-axis in a vertical direction (distance direction), Z-axis in a depth direction and the center point as $(x, y, z) = (0, 0, 0)$, to represent a radial curvature forming a basis of the combined refracting surface as $c_p$ and a radial curvature determined from the aspheric addition amount as $c\delta$, then a radial curvature $c_t$ of a combined refracting surface added with the aspheric addition amount is expressed as $c_t = c_p + c\delta$.

According to the third computation method of an aspheric addition amount, there is an advantage that optical evaluation is easy, design is easy and objective prescription is easy to obtain because of determining an inclination distribution. A Z-coordinate can be determined by an integration of from the origin.

It is preferable that, provided that a coordinate system is defined, as viewing the combined refracting surface from front of spectacles being worn, with X-axis in a left-light direction, Y-axis in a vertical direction (distance direction), Z-axis in a depth direction and the center point as $(x, y, z) = (0, 0, 0)$, to represent a coordinate forming a basis of the combined refracting surface as $z_p$ and a Koreinich coefficient determined from the aspheric addition amount as $c\delta$, then a coordinate $z_t$ of a combined refracting surface added with the aspheric addition amount is expressed, using $b_p$ defined in the following equation (1)

$$b_p = \frac{2z_p}{x^2 + y^2 + z_p^2}, \quad (1)$$

as the following equation (2)

$$z_t = \frac{(b_p + c\delta)r^2}{1 + \sqrt{1 - (b_p + c\delta)^2 r^2}} \quad (2)$$

(where r is a distance from the center point wherein it is expressed as $r = (x^2 + y^2)^{1/2}$).

According to the fourth computation method of an aspheric addition amount, there is an advantage that optical evaluation is easy, design is easy and objective prescription is easy to obtain because of determining an inclination distribution. A Z-coordinate can be advantageously determined by computation without resort to an integration.

It is preferable that, provided that a coordinate system is defined, as viewing the combined refracting surface from front of spectacles being worn, with X-axis in a left-light direction, Y-axis in a vertical direction (distance direction), Z-axis in a depth direction and the center point as $(x, y, z) = (0, 0, 0)$, to represent a coordinate forming a basis of the combined refracting surface as $z_p$ and a Koreinich coefficient determined from the aspheric addition amount as $k\delta$ ($k\delta = -e^2$, e is an eccentricity), then a coordinate $z_t$ of a combined refracting surface added with the aspheric addition amount is expressed, using $b_p$ defined in the following equation (1)

$$b_p = \frac{2z_p}{x^2 + y^2 + z_p^2}, \quad (1)$$

as the following equation (3)

$$z_t = \frac{b_p r^2}{1 + \sqrt{1 - (1 + k\delta)b_p^2 r^2}} \quad (3)$$

(where r is a distance from the center point wherein it is expressed as $r = (x^2 + y^2)^{1/2}$).

According to the fifth computation method of an aspheric addition amount, design can be made to provide a smooth change of curvature, thus obtaining a natural progressive surface shape free of a sharp change in dioptric power or the like.

It is preferable that the combined refracting surface is provided in a refracting surface at a side closer to the eye.

By arranging a combined refracting surface in a refracting surface at a side closer to the eye, the refracting surface at a side closer to the object can be made spherical. This can reduce the factors of fluctuations and distortions, defects of the progressive power lens, thus improving optical capability. Besides, simultaneously realized are astigmatism reduction as the effect of the invention or lens thickness reduction.

BRIEF DESCRIPTION OF THE DRAWINGS

The invention will be described with reference to the accompanying drawings, wherein like numbers reference like elements.

FIG. 3A is an iso-astigmatism diagram of a spectacle lens designed in embodiment 1 while

FIG. 4A is an iso-astigmatism diagram of a spectacle lens designed in embodiment 2 while

FIG. 5A is an iso-astigmatism diagram of a spectacle lens designed in embodiment 3 while

DESCRIPTION OF EXEMPLARY EMBODIMENTS

Description will be now made on embodiments of a designing method of a spectacle lens according to the invention. Note that the invention is not limited to the ensuing embodiments.

The spectacle-lens designing method in the invention is a designing method of a spectacle lens having a combined refracting surface where an astigmatic refracting surface is combined with a progressive refracting surface having a distance-use area, a near-use area different in refractive power from the distance-use area and a progressive area having a refractive power progressively changing between those, in at least any one refracting surface of the two refracting surfaces, at a side closer to the object (outer) and at a side closer to the eye (inner), constituting a spectacle lens.

The astigmatism-correcting toric surface has a cylinder axis that differs 180 degrees depending upon a prescription wherein the dioptric power for correcting an astigmatism also differs depending upon a prescription. It is not much to say that the refractive power of the combined refracting surface, in distance-use and near-use areas, is different on a spectacle-lens-by-spectacle-lens basis. For this reason, a spectacle lens, having a combined refracting surface where progressive and astigmatic refracting surfaces are combined together, is necessarily of a made-to-order design, requiring a design for each spectacle lens. Even where the eye-glass-lens designing method of the invention is applied, productivity does not lower except for computation amount increase, thus making it possible to provide a spectacle lens having an optical property optimal for a person requiring sight correction for both progressive an cylindrical powers.

In designing a spectacle lens having a progressive refractive power, it is a practice to segment a spectacle lens as a distance-use area positioning at the upper in the lens and for viewing a distance, a near-use area positioning at the lower in the lens and for seeing a nearby object, and a progressive area connecting the distant and nearby areas smoothly and for looking a middle distance. In application-based designs, there can be roughly divided as so-called bifocal design that distant and nearby visual fields are both arranged with balance, distance-middle-based design that emphasis is placed on broad distant and middle visual fields, and middle-near-based design that emphasis is placed on a visual field of from a middle range of some 1 meter to an at-hand. Meanwhile, in distributional designs of distortion and astigmatism, there can roughly divided as aberration-concentrated type that distance-use and near-use areas are taken broad to gather the aberration in the narrow progressive area, and aberration-distributed type that the progressive area is taken broad to disperse the aberration in the intermediate area. The spectacle-lens designing method in the invention can cope with a spectacle lens in any of the categories of progressive refractive powers.

Figure 1A:
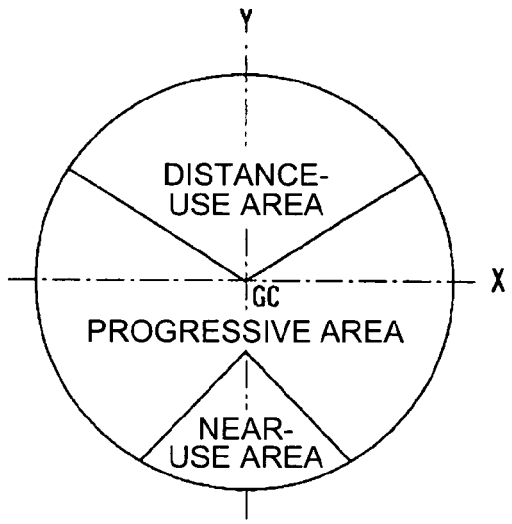
FIGS. 1A-1D are concept figures showing segmentation examples of distance-use, near-use and progressive areas on the progressive power lens.
Figure 1B:
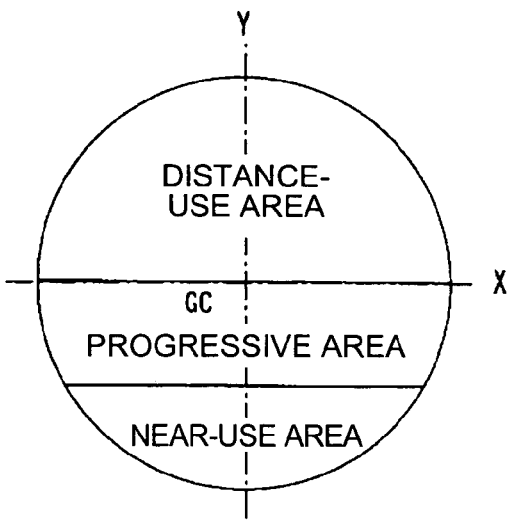
Figure 1C:
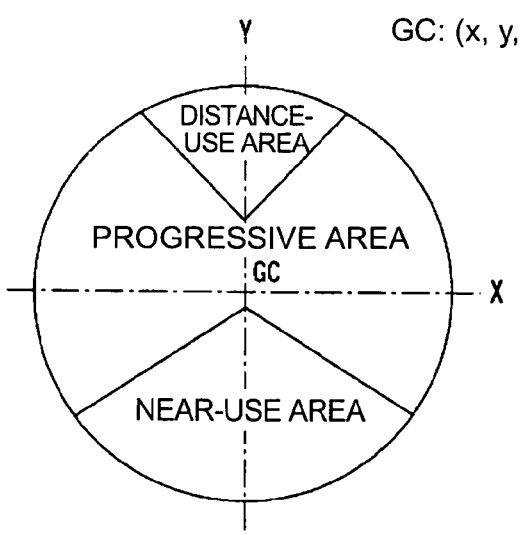
Figure 1D:
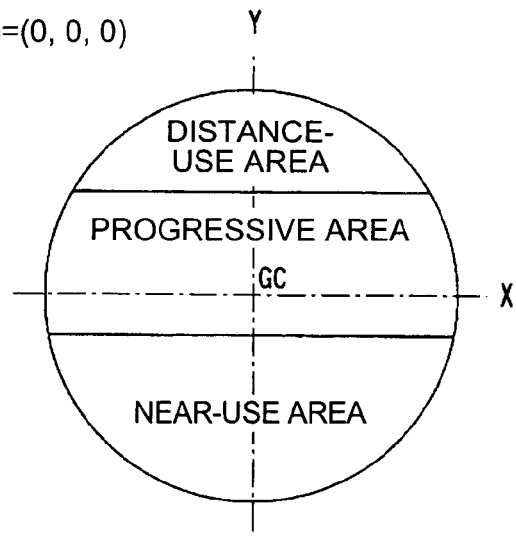

FIGS. 1A-1D show some examples of segmentations with distance-use, progressive and near-use areas. In the figure, the spectacle lens is viewed at its combined refracting surface from the front during wearing the spectacles, wherein the left-right direction is shown as X-axis and the vertical direction (distance direction) is as Y-axis. FIG. 1A is a typical view of a segmentation example of distance-use, progressive and near-use areas in a bifocal design of aberration-dispersed type. FIG. 1B is a typical view of a segmentation example of distance-use, progressive and near-use areas in a bifocal design of aberration-concentration type. FIG. 1C is a typical view of a segmentation example of distance-use, progressive and near-use areas in a middle-near-use-based design of aberration-dispersed type. FIG. 1D is a typical view of a segmentation example of distance-use, progressive and near-use areas in a middle-near-use-based design of aberration-concentrated type.

Meanwhile, the astigmatism-correcting toric surface is defined as a surface whose radius of curvature is different in the cross-sections mutually orthogonal, wherein it possess a maximal refractive power on a certain meridian plane and a minimal refractive power on a meridian plane perpendicular to the same.

There is disclosed, e.g. in WO97/19382, a combined-refracting-surface designing method for combining a progressive refracting surface and a toric surface together. Namely, a desired point $P(x, y, z)$ on a combined refracting surface has a coordinate z that can be expressed as the following equation (4) by use of the approximate curvature Cp at the desired point P on the progressive refractive surface in spherical design and the X-directional curvature Cx and y-directional curvature Cy of the toric surface to be added to the progressive refracting surface in spherical design.

$$z = \frac{(Cp+Cx)x^2 + (Cp+Cy)y^2}{1 + \sqrt{1 - (Cp+Cx)x^2 - (Cp+Cy)^2 y^2}} \quad (4)$$

The distance-use and near-use areas, of the spectacle lens having such a combined refractive surface, are made aspheric because they are combined with an astigmatism-correcting refractive surface. In the designing method proposed in JP-A-2000-66148 by the present inventor, the additional aspheric amount is determined on the assumption that the distance-use and the near-use areas entirely are each to be represented by one average dioptric power by ignoring the aspheric surface due to the astigmatism. Note that the additional spherical surface (whose addition amount is referred to as an aspheric addition amount), in the description, signifies a refracting surface having a curvature changing continuously from the apex of the spectacle lens to the surroundings except for the progressive and astigmatic refracting surfaces.

The spectacle-lens designing method in the invention is a designing method that optimizes the aspheric addition amount by precisely determining the aspheric addition amount for the distance-use and near-use areas. The spectacle-lens designing method in the invention includes establishing reference lines extending at least two radial directions from a center point in the vicinity of a geometric center of the spectacle lens in any one of the distance-use and near-use areas, in a first reference-line establishing step; setting a reference line extending at least one radial direction from the center point of the spectacle lens in the other of the distance-use and near-use areas, in a second reference-line establishing step; determining an aspheric addition amount for refractive powers acting along the respective reference lines, in an aspheric addition amount determining step; and determining an aspheric addition amount for a refractive power of between the reference lines by interpolation, in an interpolation step.

Figure 2A:
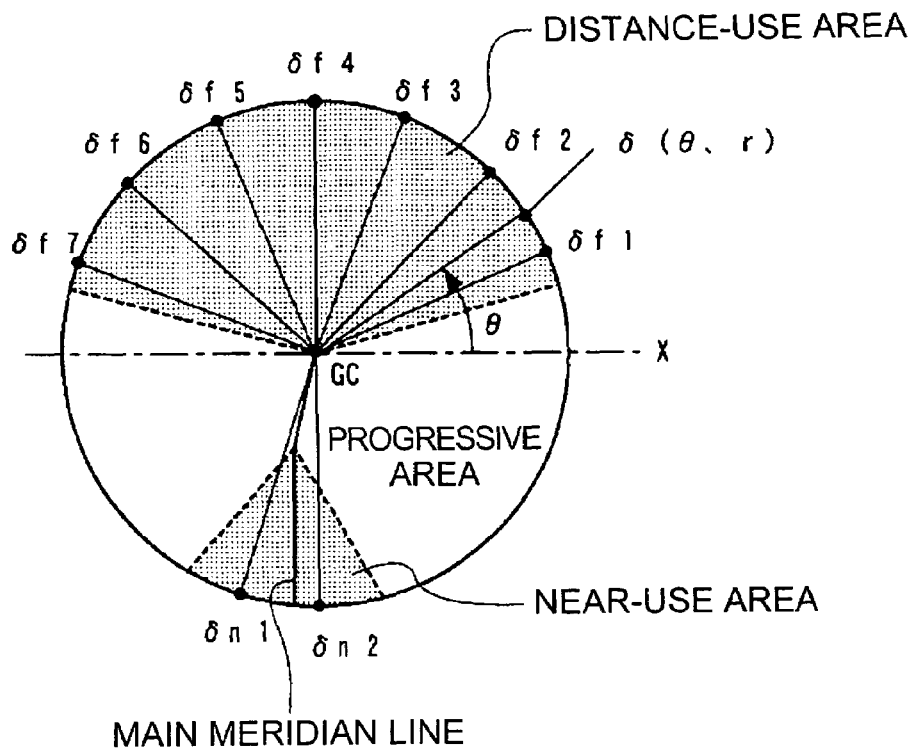
FIGS. 2A and 2B are concept figures showing a designing method of a progressive power lens of the invention.
Figure 2B:
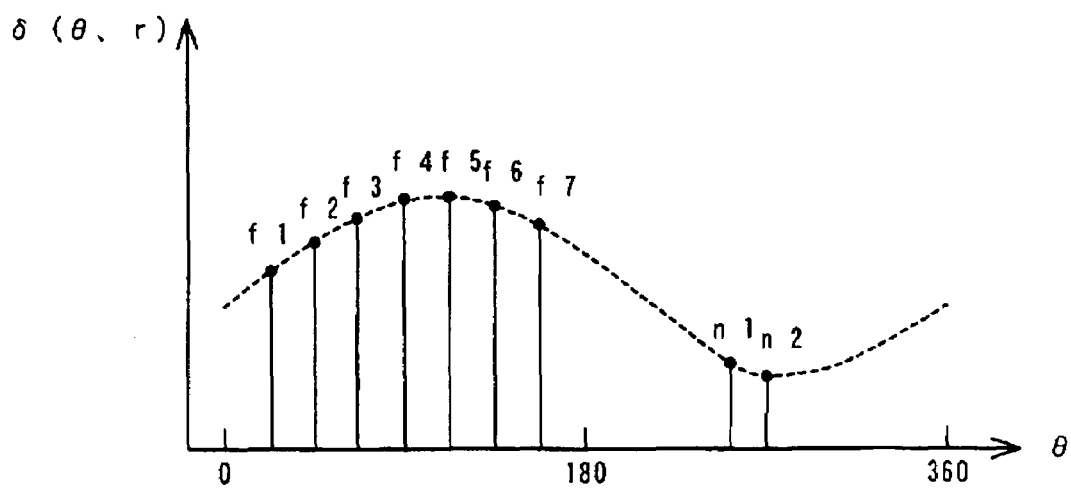

FIGS. 2A and 2B show a concept figure explaining the designing method of a spectacle lens in the invention. FIG. 2A is a concept figure of the spectacle lens as viewed from the front while FIG. 2B is a graph of plotting aspheric addition amounts at intersections of the reference lines with a counterclockwise circle path in a certain distance from the center point.

The spectacle lens, shown in FIGS. 2A and 2B, is a progressive multi-focal lens of an aberration-dispersed type in bifocal design. The distance-use and near-use areas are fan-shaped respectively about a distance-use center and a near-use center, which are painted over by dots. The spectacle lens is for left-eye use wherein the main meridian line, shown by a line comparatively bold, is shifted toward the nose on the left hand in the figure at its portion of from the distance-use center to the near-use center, taking account of visual convergence.

The spectacle lens design in the invention is based usually on the geometric center of the spectacle lens, thus using the geometric center as a center. However, it is possible to select, as a center point, a desired point in the vicinity of the geometric center. In a progressive power lens of a bifocal design, the spectacle-lens geometric center GC practically coincides with the distance-use center, as shown in FIG. 2(a).

In the first reference-line establishing step, selected is a broader one of the distance-use area and the near-use area, to establish at least two reference lines that radially extend linearly from the geometric center GC and reach the end edge of the spectacle lens through the distance-use or near-use area. For example, the distance-use area broader is selected in bifocal design whereas the near-use area broader is selected in middle-nearby-based design. By establishing two or more reference lines, it is possible to exactly grasp a refractive power for the broader distance-use or near-use area.

In FIG. 2A is shown an example that seven reference lines Pf1-Pf7 are established in the distance-use area broader than the near-use area. Those seven reference lines are set up at an equal angular interval of 22.5 degrees counterclockwise from the horizontal X-axis passing the geometric center GC. The reference line Pf4 is given in the same direction as and overlapped with the main meridian line.

When establishing the two reference lines minimal in the number, the reference lines are preferably set up in a direction of the cylinder axis and in the direction orthogonal to the cylinder axis. This makes it possible to correctly grasp a refractive power on the distance-use or near-use area by means of the minimal two reference lines. Where establishing three reference lines, it is preferred to provide three lines at both ends of the distance-use or near-use area and in the center region. This makes it possible to grasp a refractive power within the region of the distance-use or near-use area. The number of reference lines, if available greater in the number, assures design with greater exactness. Hence, those may be preferably by the number of three or more in the region of the distance-use or near-use area, e.g. and can be set up at an interval of 5, 10, 15, 20 or 22.5 degrees. Note that the reference lines must not be established at an equal angular interval.

Subsequently, in the second reference line establishing step, selected is a narrower one of the distance-use and the near-use areas, to establish at least one reference line that radially extends linearly from the geometric center GC and reaches the end edge of the spectacle lens through the distance-use or near-use area. For example, the near-use area narrower is selected in bifocal design whereas the distance-use area narrower is selected in middle-nearby-based design. The reference line can be desirably established one or more in the number. For example, the reference line can employ one line segment connected between a spectacle-lens geometric center and a distance-use or near-use center and extended to an end edge of the spectacle lens. Where the distance-use and near-use areas are narrow, one reference line if represented for the entire area of the distance-use or nearby-area can fully grasp an aspheric surface for astigmatism correction. Naturally, establishing two or more reference lines provides a design with further exactness, thus optimizing correction. In the example shown in FIGS. 2A and 2B, two reference lines Pn1 and Pn2 are given as lines connecting between such end-edge points, as dividing a fan arc of the near-use area equally into three, and the center point GC. For example, reference lines can be set up to extend from the spectacle-lens geometric center to the end edge in the region of the distance-use or near-use area, at an interval of 5, 10, 15, 20 or 22.5 degrees. Note that, in this case, reference lines must not be set up at an equal angle interval.

The first and second reference line establishing steps can be replaced in order with each other, i.e. the first reference line establishing step may be made after the second reference line establishing step.

Then, in the aspheric addition amount determining step, an aspheric addition amount is determined for a refractive power on the combined refracting surface and along the reference line thus established. For each of the reference lines, an aspheric addition amount can be assumed the same condition as that the spectacle lens being worn over the eye, in respect of the refractive power on the combined refracting surface along the reference line. By ray tracing, dioptric power, astigmatism, prism, etc. are computed, wherein it is possible to employ a known approach for determining the optimal aspheric addition amount.

There are the following five computation methods, as methods to compute an aspheric addition amount. For an spectacle-lens coordinate system, a coordinate system is first defined, as shown in Figs. 1A-1D, having X-axis in a left-right direction as viewing the combined refracting surface from the front during wearing the spectacles, Y-axis in a vertical direction (distance direction) and Z-axis in a depth direction, wherein (x, y, z)=(0, 0, 0) (origin) is taken by a center point GC of the reference lines as set in the first and second reference line establishing steps.

The first aspheric addition amount computation method is a method to directly compute a Z-axis coordinate of an aspheric addition amount. The depth coordinate $z_p$ of the combined refracting surface is expressed in terms of a function of coordinate (x, y) as in the following.

$$z_p = f(x, y)$$

In case $z_p$ is added with a Z-directional aspheric addition amount $\delta$, provided that post-addition Z-directional combined coordinate, i.e. provided that a new coordinate of combined refractive surface is $z_t$, then $z_t = z_p + \delta$ results.

At this time, at and around the lens center point GC, there is less prisms and less occurrences of astigmatism, the aspheric addition amount may be small. However, at lens outer periphery, astigmatism is ready to occur because of an angle of the ray coming to the eye. It is a general practice to increase the aspheric addition amount for correcting it. The ideal aspheric addition amount, to be practically applied changes in accordance with a distance r of from the center point GC though it is largely different depending upon user's prescription (lens dioptric power). From the above, the optimal aspheric addition amount $\delta$, to be applied, is given as a function of a distance r of from the center point GC.

$$r = (x^2 + y^2)^{1/2}$$

Otherwise, as was shown in FIGS. 2A and 2B, the aspheric addition amount $\delta$ can be expressed as a function of $(\theta, r)$ by setting a counterclockwise angle $\theta$ staring from the X-axis passing the geometric center GC, for example. This is true in the following computation methods.

The first computation method of an aspheric addition amount has an advantage that computation is easy because of the capability to determine a coordinate directly.

The second computation method of an aspheric addition amount uses the relationship of $dz_t = dz_p + d\delta$ provided that the radial inclination of a basic combined refracting surface is represented as $dz_p$ and the inclination of a new combined refracting surface is as $dz_t$.

The second computation method of an aspheric addition amount has an advantage that prism amount is easy to control because of determining an inclination distribution. A Z-coordinate can be determined by an integration of from the origin.

The third computation method of an aspheric addition amount uses the relationship of $c_r=c_p+c\delta$ provided that the radial curvature of a basic combined refracting surface is represented as $c_p$ and the curvature of a new combined refracting surface is as $c_r$.

The third computation method of an aspheric addition amount has an advantage that, because of determining a curvature distribution, optical evaluation is easy, design is ready and objective prescription is easy to obtain. A Z-coordinate can be determined by an integration of from the origin.

The fourth computation method of an aspheric addition amount uses $b_p$ as defined by the following equation (1), that the coordinate of the basic combined refracting surface is represented zp and a coordinate zt of a new combined refracting surface replaces the Z-coordinate of the combined refracting surface into a curvature, $$b_p = \frac{2z_p}{x^2+y^2+z_p^2} \quad (1)$$

to thereby use the relationship expressed by the following equation (2).

$$z_t = \frac{(b_p+c\delta)r^2}{1+\sqrt{1-(b_p+c\delta)^2 r^2}} \quad (2)$$

The fourth computation method of an aspheric addition amount has an advantage that optical evaluation is easy, design is ready, objective prescription is easy to obtain and Z-coordinate can be directly computed without resort to integration because of determining a curvature distribution.

The fifth computation method of an aspheric addition amount uses $b_p$ as defined by the following equation (1), that the coordinate of the basis combined refracting surface is represented zp and a coordinate zt of a new combined refracting surface replaces the Z-coordinate of the combined refracting surface into a curvature, $$b_p = \frac{2z_p}{x^2+y^2+z_p^2} \quad (1)$$

to thereby use the relationship expressed by the following equation (3).

$$z_t = \frac{b_p r^2}{1+\sqrt{1-(1+k\delta)b_p^2 r^2}} \quad (3)$$

The fifth computation method of an aspheric addition amount can make a design in a manner providing a smooth change of curvature, thus providing a natural progressive surface shape free of sharp changes in dioptric power.

In the aspheric addition amount determining step, an aspheric addition amount δ is determined, along the reference line, as a function of a distance r of from the center point GC and angle θ counterclockwise from X-axis, for each of the reference lines.

Then, in the interpolation step, an aspheric addition amount is determined, by interpolation, for the refractive power in the region of between the reference lines, to smoothly add an aspheric-surface component to the entire refracting surface. Interpolation refers to a computation that, by knowing functional values at two or more points of a function, a functional value is determined as to a point of between those. The ordinary interpolation methods include Lagrange interpolation and spline interpolation that are well known. The invention can adopt the ordinary interpolation.

FIG. 2B is a graph of plotting of aspheric addition values δ at nine points on the reference lines δf1-δf7 as well as δn1 and δn2, shown in FIG. 2A, that are equally distant (lens end edge in FIGS. 2A, 2B) from the center points GC, provided that on ordinate is taken a values of aspheric addition value δ determined by the first to fifth aspheric-addition-value computation methods while on abscissa is taken angle θ counterclockwise of a start point X-axis. Interpolation is a computation method that determines a smooth curve equation shown by a FIG. 2B broken line passing all the nine points of aspheric addition amount δ. This can determine the optimal aspheric addition amount throughout the spectacle lens.

Next described is a progressive power lens that takes account of dioptric-power measurements at a lens-meter. The progressive power lens has an additional dioptric powers progressively applied at from the progress-start point. Accordingly, when measuring a dioptric power by a lens-meter, it is a usual practice to establish a dioptric-power measurement point at a location 5-10 mm offset, toward the distance, from the progress-start point by taking account of a ray width of the lens-meter. However, in case aspheric design is done up to the progress-start point or its around, an astigmatism takes place upon a measurement of the dioptric power by the lens-meter, making it impossible to assure the dioptric power of the lens.

For this reason, in bifocal design, it is preferred to provide a spherical design region without the addition of an aspheric surface to an area of from a progress-start point, practically coincident with the geometric center GC, up to a distance of predetermined r. It is preferred to take r at 7 mm or greater and smaller than 12 mm at which the dioptric-power measurement point can be covered. Such a spherical design region, even if provided, has not so great effect upon optical capability because the area around the progress-start point is near to the optical axis and less, in nature, in amount of ideal aspheric addition amount.

The progressive power lens, forming a basis of the spectacle-lens designing method of the invention, is preferably made as so-called an inner-surface progressive power lens that has a combined refracting surface in a refracting surface at a side closer to the eye. By arranging the combined refracting surface at a side closer to the eye, the refracting surface at a side closer to the object can be provided with a spherical surface. This is known to reduce the factors of fluctuations and distortions, that are defects of a progressive power lens, thus improving optical capability (WO97/19382). In case the invention is applied to a progressive power lens arranging a combined refracting surface at a side closer to the eye, it is possible to realize the reduction of astigmatism and lens thickness as the effect of the invention, in addition to the reduction effect of fluctuations and distortions disclosed in WO97/19382.

EMBODIMENTS

Embodiment 1

The spectacle-lens designing method of the invention was applied to the progressive power lens of the aberration-dispersed type in bifocal design shown in FIG. 2A. The basic progressive power lens is so-called an inner-surface progressive lens having a spherical surface at a side closer to the object and a combined refracting surface, at a side closer to the eye, where progressive and cylindrical powers are combined together. This has a base curve of 5.00 D, a spherical refractive power S of 0.00 D, a circular cylindrical refractive power C of +2.00 D, a cylinder axis of 90 degrees, an addition power of 2.00 D and a lens-center thickness t of 2.9 mm.

Reference lines were set up at angular θ interval of 5 degrees relative to X-axis and about the geometric center GC shown in FIG. 2A, to establish 25 reference lines in a broader distance-use area and 7 reference lines in a narrower near-use area.

For each of the reference lines, determined were coordinate values as to the combined refracting surface of the basic progressive power lens, along the reference line, to compute an approximate equation of a curved surface along the reference line. By ray tracing on the refractive power of the curved surface approximate equation, computed, for each of the reference lines, are tertiary and quartic aspheric coefficients of the following aspheric equation that is to determine an aspheric addition amount $\delta(\theta, r)$ as an Z-directional increase/decrease to/from the combined refracting surface coordinate value of the basic progressive refractive power.

$$\delta(\theta, r) = \sum_n a_n(\theta) \cdot (r - r_0)^n$$

Here, $a_n$ represents an n-degree aspheric coefficient while $r_0$ a radial deviation between a reference point and a geometric center. In the embodiment, $r_0 = 0$ was applied in every case.

Due to this, aspheric addition amounts $\delta(\theta, r)$ along the reference lines were determined for each of the reference lines set up at an interval of 5 degrees. Then, tertiary and quartic aspheric coefficients for the aspheric equation are computed by spline interpolation of between the reference lines, to determine an aspheric addition amount for the region between the reference lines.

Table 1 shows the data of aspheric coefficients $a_3(\theta)$, $a_4(\theta)$ and aspheric addition amounts $\delta(\theta, r)$ (in the units of μm) that is at an interval of 30 degrees. The minus sign on the aspheric addition amount represents to add an aspheric surface in a direction of moving the combined refracting surface of the basic progressive refractive power from the eye toward the object. The plus sign on the aspheric addition amount represents to add an aspheric surface in a direction of moving the combined refracting surface of the basic progressive refractive power from the object toward the eye.

TABLE 1

| | $\theta_{(deg)}$ | | | | | | |
|---|---|---|---|---|---|---|---|
| $r_{(mm)}$ | 0 | 30 | 60 | 90 | 120 | 150 | 180 |
| $a_3(\theta)$ | 3.17E−06 | 1.90E−06 | −2.36E−07 | −1.62E−06 | −2.36E−07 | 1.90E−06 | 3.17E−06 |
| $a_4(\theta)$ | 1.21E−08 | 7.10E−09 | −1.97E−08 | −3.23E−08 | −1.97E−08 | 7.10E−09 | 1.21E−08 |
| 0 | 0.0 | 0.0 | 0.0 | 0.0 | 0.0 | 0.0 | 0.0 |
| 1 | 0.0 | 0.0 | 0.0 | 0.0 | 0.0 | 0.0 | 0.0 |
| 2 | 0.0 | 0.0 | 0.0 | 0.0 | 0.0 | 0.0 | 0.0 |
| 3 | 0.0 | 0.0 | 0.0 | 0.0 | 0.0 | 0.0 | 0.0 |
| 4 | 0.0 | 0.0 | 0.0 | 0.0 | 0.0 | 0.0 | 0.0 |
| 5 | 0.0 | 0.0 | 0.0 | 0.0 | 0.0 | 0.0 | 0.0 |
| 6 | 0.0 | 0.0 | 0.0 | −0.1 | 0.0 | 0.0 | 0.0 |
| 7 | 0.1 | 0.0 | 0.0 | −0.1 | 0.0 | 0.0 | 0.1 |
| 8 | 0.1 | 0.0 | −0.1 | −0.1 | −0.1 | 0.0 | 0.1 |
| 9 | 0.1 | 0.1 | −0.1 | −0.2 | −0.1 | 0.1 | 0.1 |
| 10 | 0.2 | 0.1 | −0.2 | −0.3 | −0.2 | 0.1 | 0.2 |
| 11 | 0.2 | 0.1 | −0.3 | −0.5 | −0.3 | 0.1 | 0.2 |
| 12 | 0.3 | 0.2 | −0.4 | −0.7 | −0.4 | 0.2 | 0.3 |
| 13 | 0.4 | 0.2 | −0.6 | −0.9 | −0.6 | 0.2 | 0.4 |
| 14 | 0.5 | 0.3 | −0.8 | −1.3 | −0.8 | 0.3 | 0.5 |
| 15 | 0.7 | 0.4 | −1.0 | −1.7 | −1.0 | 0.4 | 0.7 |
| 16 | 0.8 | 0.5 | −1.3 | −2.1 | −1.3 | 0.5 | 0.8 |
| 17 | 1.1 | 0.6 | −1.7 | −2.7 | −1.7 | 0.6 | 1.1 |
| 18 | 1.3 | 0.8 | −2.1 | −3.4 | −2.1 | 0.8 | 1.3 |
| 19 | 1.6 | 1.0 | −2.6 | −4.2 | −2.6 | 1.0 | 1.6 |
| 20 | 2.0 | 1.2 | −3.2 | −5.2 | −3.2 | 1.2 | 2.0 |
| 21 | 2.4 | 1.4 | −3.8 | −6.3 | −3.8 | 1.4 | 2.4 |
| 22 | 2.9 | 1.7 | −4.6 | −7.6 | −4.6 | 1.7 | 2.9 |
| 23 | 3.5 | 2.0 | −5.5 | −9.1 | −5.5 | 2.0 | 3.5 |
| 24 | 4.1 | 2.4 | −6.6 | −10.8 | −6.6 | 2.4 | 4.1 |
| 25 | 4.8 | 2.8 | −7.7 | −12.7 | −7.7 | 2.8 | 4.8 |
| 26 | 5.6 | 3.3 | −9.0 | −14.8 | −9.0 | 3.3 | 5.6 |
| 27 | 6.5 | 3.8 | −10.5 | −17.2 | −10.5 | 3.8 | 6.5 |
| 28 | 7.6 | 4.4 | −12.1 | −19.9 | −12.1 | 4.4 | 7.6 |

TABLE 1-continued

| | | | | | | |
|---|---|---|---|---|---|---|
| 29 | 8.7 | 5.1 | −14.0 | −22.9 | −14.0 | 5.1 | 8.7 |
| 30 | 9.9 | 5.8 | −16.0 | −26.2 | −16.0 | 5.8 | 9.9 |

| | $\theta_{(deg)}$ | | | | | |
|---|---|---|---|---|---|---|
| $r_{(mm)}$ | 210 | 240 | 270 | 300 | 330 | 360 |
| $a_3(\theta)$ | 3.66E−06 | 3.32E−06 | 2.49E−06 | 3.32E−06 | 3.66E−06 | 3.17E−06 |
| $a_4(\theta)$ | −6.40E−09 | −2.70E−08 | −3.14E−08 | −2.70E−08 | −6.40E−09 | 1.21E−08 |
| 0 | 0.0 | 0.0 | 0.0 | 0.0 | 0.0 | 0.0 |
| 1 | 0.0 | 0.0 | 0.0 | 0.0 | 0.0 | 0.0 |
| 2 | 0.0 | 0.0 | 0.0 | 0.0 | 0.0 | 0.0 |
| 3 | 0.0 | 0.0 | 0.0 | 0.0 | 0.0 | 0.0 |
| 4 | 0.0 | 0.0 | 0.0 | 0.0 | 0.0 | 0.0 |
| 5 | 0.0 | 0.0 | 0.0 | 0.0 | 0.0 | 0.0 |
| 6 | 0.0 | 0.0 | 0.0 | 0.0 | 0.0 | 0.0 |
| 7 | 0.0 | 0.0 | −0.1 | 0.0 | 0.0 | 0.1 |
| 8 | 0.0 | −0.1 | −0.1 | −0.1 | 0.0 | 0.1 |
| 9 | 0.0 | −0.1 | −0.2 | −0.1 | 0.0 | 0.1 |
| 10 | 0.0 | −0.2 | −0.3 | −0.2 | 0.0 | 0.2 |
| 11 | −0.1 | −0.4 | −0.4 | −0.4 | −0.1 | 0.2 |
| 12 | −0.1 | −0.5 | −0.6 | −0.5 | −0.1 | 0.3 |
| 13 | −0.1 | −0.7 | −0.9 | −0.7 | −0.1 | 0.4 |
| 14 | −0.2 | −1.0 | −1.2 | −1.0 | −0.2 | 0.5 |
| 15 | −0.3 | −1.3 | −1.6 | −1.3 | −0.3 | 0.7 |
| 16 | −0.4 | −1.7 | −2.0 | −1.7 | −0.4 | 0.8 |
| 17 | −0.5 | −2.2 | −2.6 | −2.2 | −0.5 | 1.1 |
| 18 | −0.6 | −2.8 | −3.3 | −2.8 | −0.6 | 1.3 |
| 19 | −0.8 | −3.5 | −4.0 | −3.5 | −0.8 | 1.6 |
| 20 | −1.0 | −4.2 | −5.0 | −4.2 | −1.0 | 2.0 |
| 21 | −1.2 | −5.2 | −6.1 | −5.2 | −1.2 | 2.4 |
| 22 | −1.4 | −6.2 | −7.3 | −6.2 | −1.4 | 2.9 |
| 23 | −1.7 | −7.5 | −8.7 | −7.5 | −1.7 | 3.5 |
| 24 | −2.0 | −8.9 | −10.4 | −8.9 | −2.0 | 4.1 |
| 25 | −2.4 | −10.4 | −12.2 | −10.4 | −2.4 | 4.8 |
| 26 | −2.8 | −12.2 | −14.3 | −12.2 | −2.8 | 5.6 |
| 27 | −3.3 | −14.2 | −16.6 | −14.2 | −3.3 | 6.5 |
| 28 | −3.8 | −16.5 | −19.3 | −16.5 | −3.8 | 7.6 |
| 29 | −4.4 | −19.0 | −22.2 | −19.0 | −4.4 | 8.7 |
| 30 | −5.1 | −21.7 | −25.4 | −21.7 | −5.1 | 9.9 |

Figure 3A:
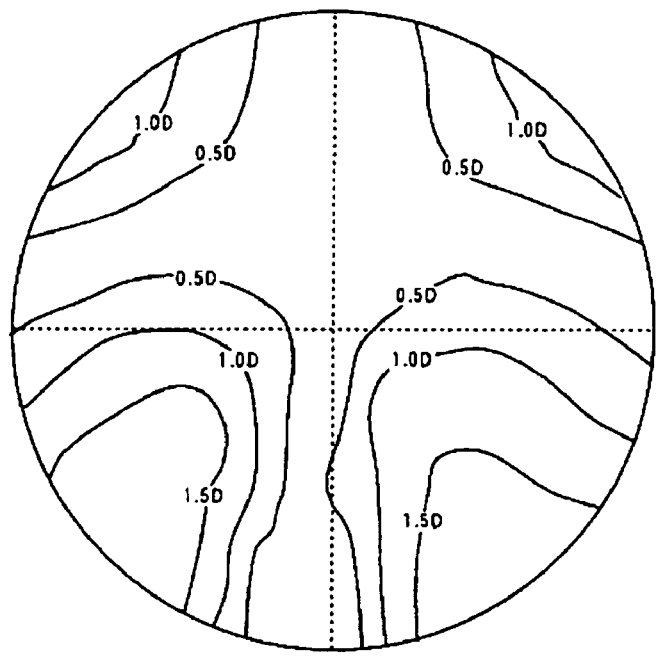
Figure 3B:
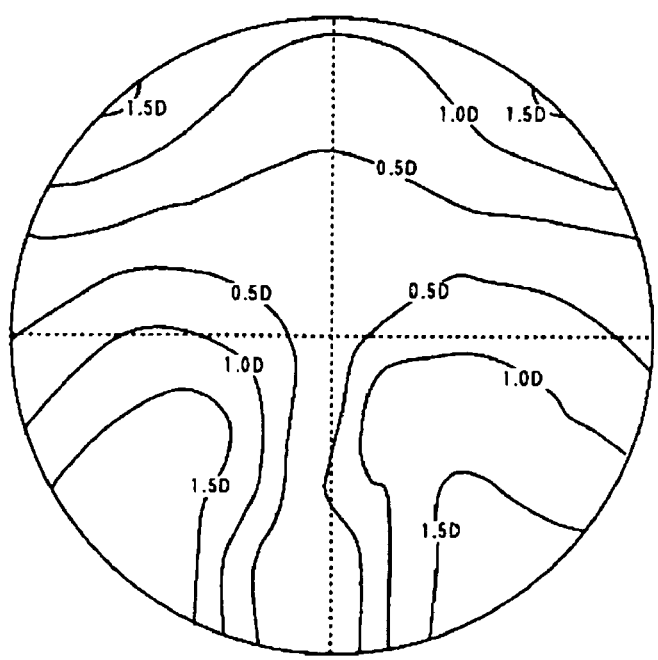
FIG. 3B is an iso-astigmatism diagram of a spectacle lens designed in the existing designing method.

FIG. 3A shows an iso-astigmatism diagram due to a simulation conducted on an assumption in a state the spectacle lens designed in embodiment 1 is worn. Meanwhile FIG. 3B shows an iso-astigmatism diagram due to a simulation conducted on an assumption in a state wearing the spectacle lens with addition of an aspheric surface by applying the designing method shown in JP-A-2000-66148 to the same original spectacle lens.

Embodiment 2

Similarly to embodiment 1, the spectacle-lens designing method of the invention was applied to the progressive multifocal lens of an aberration-dispersed type in bifocal design shown in FIG. 2A. The basic progressive power lens is so-called an inner-surface progressive lens having a spherical surface at a side closer to the object and a combined refracting surface, at a side closer to the eye, where progressive and cylindrical powers are combined together. This has a base curve of 5.00 D, a spherical refractive power S of 0.00 D, a circular cylindrical refractive power C of +2.00 D, a cylinder axis of 180 degrees, an addition power of 2.00 D and a lens-center thickness t of 3.4 mm.

Quite similarly to embodiment 1, reference lines were set up. As a Z-directional increase/decrease to/from the combined refracting surface coordinate value of the basic progressive refractive power lens along with each reference line, an aspheric addition amount $\delta(\theta, r)$ is determined by computing tertiary and quartic aspheric coefficients for the aspheric equation. Tertiary and quartic aspheric coefficients for the aspheric equation were determined by interpolation of between the reference lines, to thereby determine aspheric addition amounts for the regions between the reference lines.

Figure 4A:
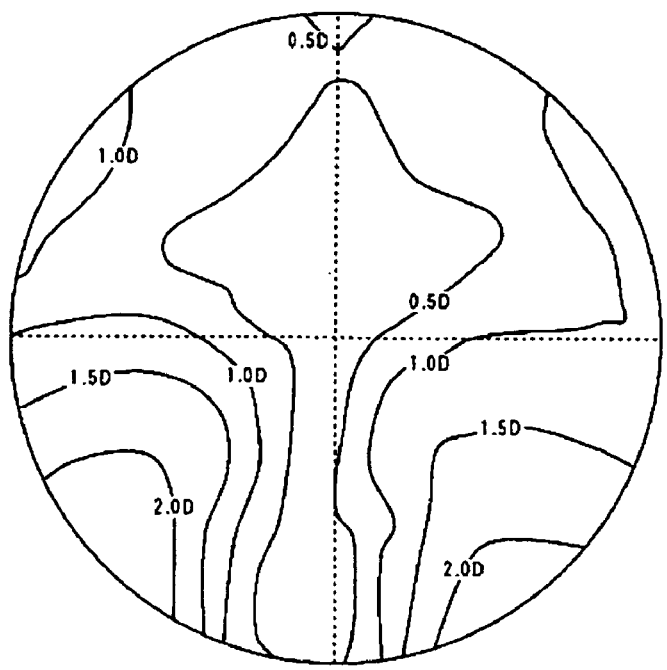
Figure 4B:
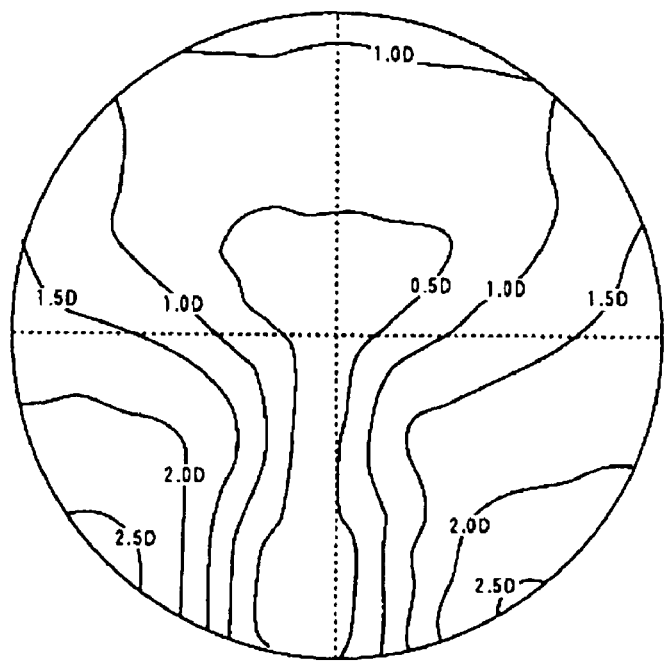
FIG. 4B is an iso-astigmatism diagram of a spectacle lens designed in the existing designing method.

Table 2 shows the data of the aspheric coefficients $a_3(\theta)$, $a_4(\theta)$ and aspheric addition amounts $\delta(\theta, r)$ (in the units of μm) that is at an interval of 30 degrees. FIG. 4A shows an iso-astigmatism diagram due to a simulation conducted on an assumption in a state the spectacle lens designed in embodiment 2 is worn. Meanwhile, FIG. 4B shows an iso-astigmatism diagram due to a simulation conducted on an assumption in a state wearing the spectacle lens with addition of an aspheric surface by applying the designing method shown in JP-A-2000-66148 to the identical original spectacle lens.

TABLE 2

| $r_{(mm)}$ | $\theta_{(deg)}$ | | | | | | |
|---|---|---|---|---|---|---|---|
| | 0 | 30 | 60 | 90 | 120 | 150 | 180 |
| $a_3(\theta)$ | 8.07E−07 | 3.51E−08 | 2.41E−06 | 4.49E−06 | 2.41E−06 | 3.51E−08 | 8.07E−07 |
| $a_4(\theta)$ | −2.01E−08 | −1.16E−08 | −1.27E−09 | 2.72E−09 | −1.27E−09 | −1.16E−08 | −2.01E−08 |
| 0 | 0.0 | 0.0 | 0.0 | 0.0 | 0.0 | 0.0 | 0.0 |
| 1 | 0.0 | 0.0 | 0.0 | 0.0 | 0.0 | 0.0 | 0.0 |
| 2 | 0.0 | 0.0 | 0.0 | 0.0 | 0.0 | 0.0 | 0.0 |
| 3 | 0.0 | 0.0 | 0.0 | 0.0 | 0.0 | 0.0 | 0.0 |
| 4 | 0.0 | 0.0 | 0.0 | 0.0 | 0.0 | 0.0 | 0.0 |
| 5 | 0.0 | 0.0 | 0.0 | 0.0 | 0.0 | 0.0 | 0.0 |
| 6 | 0.0 | 0.0 | 0.0 | 0.0 | 0.0 | 0.0 | 0.0 |
| 7 | 0.0 | 0.0 | 0.0 | 0.0 | 0.0 | 0.0 | 0.0 |
| 8 | −0.1 | 0.0 | 0.0 | 0.0 | 0.0 | 0.0 | −0.1 |
| 9 | −0.1 | −0.1 | 0.0 | 0.1 | 0.0 | −0.1 | −0.1 |
| 10 | −0.2 | −0.1 | 0.0 | 0.1 | 0.0 | −0.1 | −0.2 |
| 11 | −0.3 | −0.2 | 0.0 | 0.1 | 0.0 | −0.2 | −0.3 |
| 12 | −0.4 | −0.2 | 0.0 | 0.1 | 0.0 | −0.2 | −0.4 |
| 13 | −0.6 | −0.3 | 0.0 | 0.1 | 0.0 | −0.3 | −0.6 |
| 14 | −0.8 | −0.4 | 0.0 | 0.2 | 0.0 | −0.4 | −0.8 |
| 15 | −1.0 | −0.6 | 0.0 | 0.2 | 0.0 | −0.6 | −1.0 |
| 16 | −1.3 | −0.8 | 0.0 | 0.2 | 0.0 | −0.8 | −1.3 |
| 17 | −1.7 | −1.0 | −0.1 | 0.3 | −0.1 | −1.0 | −1.7 |
| 18 | −2.1 | −1.2 | −0.1 | 0.4 | −0.1 | −1.2 | −2.1 |
| 19 | −2.6 | −1.5 | −0.1 | 0.4 | −0.1 | −1.5 | −2.6 |
| 20 | −3.2 | −1.8 | −0.2 | 0.5 | −0.2 | −1.8 | −3.2 |
| 21 | −3.9 | −2.2 | −0.2 | 0.6 | −0.2 | −2.2 | −3.9 |
| 22 | −4.7 | −2.7 | −0.2 | 0.7 | −0.2 | −2.7 | −4.7 |
| 23 | −5.6 | −3.2 | −0.3 | 0.9 | −0.3 | −3.2 | −5.6 |
| 24 | −6.7 | −3.8 | −0.4 | 1.0 | −0.4 | −3.8 | −6.7 |
| 25 | −7.8 | −4.5 | −0.4 | 1.2 | −0.4 | −4.5 | −7.8 |
| 26 | −9.2 | −5.3 | −0.5 | 1.4 | −0.5 | −5.3 | −9.2 |
| 27 | −10.7 | −6.1 | −0.6 | 1.6 | −0.6 | −6.1 | −10.7 |
| 28 | −12.3 | −7.1 | −0.7 | 1.8 | −0.7 | −7.1 | −12.3 |
| 29 | −14.2 | −8.2 | −0.8 | 2.1 | −0.8 | −8.2 | −14.2 |
| 30 | −16.3 | −9.4 | −1.0 | 2.3 | −1.0 | −9.4 | −16.3 |

| $r_{(mm)}$ | $\theta_{(deg)}$ | | | | | |
|---|---|---|---|---|---|---|
| | 210 | 240 | 270 | 300 | 330 | 360 |
| $a_3(\theta)$ | 3.72E−06 | 6.67E−06 | 7.70E−06 | 6.67E−06 | 3.72E−06 | 8.07E−07 |
| $a_4(\theta)$ | −2.76E−08 | −3.01E−08 | −2.64E−08 | −3.01E−08 | −2.76E−08 | −2.01E−08 |
| 0 | 0.0 | 0.0 | 0.0 | 0.0 | 0.0 | 0.0 |
| 1 | 0.0 | 0.0 | 0.0 | 0.0 | 0.0 | 0.0 |
| 2 | 0.0 | 0.0 | 0.0 | 0.0 | 0.0 | 0.0 |
| 3 | 0.0 | 0.0 | 0.0 | 0.0 | 0.0 | 0.0 |
| 4 | 0.0 | 0.0 | 0.0 | 0.0 | 0.0 | 0.0 |
| 5 | 0.0 | 0.0 | 0.0 | 0.0 | 0.0 | 0.0 |
| 6 | 0.0 | 0.0 | 0.0 | 0.0 | 0.0 | 0.0 |
| 7 | 0.0 | 0.0 | 0.0 | 0.0 | 0.0 | 0.0 |
| 8 | −0.1 | −0.1 | 0.0 | −0.1 | −0.1 | −0.1 |
| 9 | −0.1 | −0.1 | −0.1 | −0.1 | −0.1 | −0.1 |
| 10 | −0.2 | −0.2 | −0.2 | −0.2 | −0.2 | −0.2 |
| 11 | −0.4 | −0.4 | −0.3 | −0.4 | −0.4 | −0.3 |
| 12 | −0.5 | −0.5 | −0.5 | −0.5 | −0.5 | −0.4 |
| 13 | −0.7 | −0.8 | −0.7 | −0.8 | −0.7 | −0.6 |
| 14 | −1.0 | −1.1 | −0.9 | −1.1 | −1.0 | −0.8 |
| 15 | −1.3 | −1.4 | −1.2 | −1.4 | −1.3 | −1.0 |
| 16 | −1.7 | −1.9 | −1.6 | −1.9 | −1.7 | −1.3 |
| 17 | −2.2 | −2.4 | −2.1 | −2.4 | −2.2 | −1.7 |
| 18 | −2.8 | −3.0 | −2.6 | −3.0 | −2.8 | −2.1 |
| 19 | −3.5 | −3.8 | −3.3 | −3.8 | −3.5 | −2.6 |
| 20 | −4.3 | −4.7 | −4.1 | −4.7 | −4.3 | −3.2 |
| 21 | −5.3 | −5.7 | −5.0 | −5.7 | −5.3 | −3.9 |
| 22 | −6.4 | −6.9 | −6.0 | −6.9 | −6.4 | −4.7 |
| 23 | −7.6 | −8.3 | −7.2 | −8.3 | −7.6 | −5.6 |
| 24 | −9.1 | −9.8 | −8.6 | −9.8 | −9.1 | −6.7 |
| 25 | −10.7 | −11.6 | −10.1 | −11.6 | −10.7 | −7.8 |
| 26 | −12.5 | −13.6 | −11.9 | −13.6 | −12.5 | −9.2 |
| 27 | −14.5 | −15.8 | −13.8 | −15.8 | −14.5 | −10.7 |
| 28 | −16.8 | −18.3 | −16.0 | −18.3 | −16.8 | −12.3 |
| 29 | −19.4 | −21.1 | −18.4 | −21.1 | −19.4 | −14.2 |
| 30 | −22.2 | −24.2 | −21.2 | −24.2 | −22.2 | −16.3 |

Similarly to embodiment 1, the spectacle-lens designing method of the invention is applied to the progressive multifocal lens of an aberration-dispersed type in bifocal design shown in FIG. 2A. The basic progressive power lens is so-called an inner-surface progressive lens having a spherical surface at a side closer to the object and a combined refracting surface, at a side closer to the eye, where progressive and cylindrical powers are combined together. This has a base curve of 5.00 D, a spherical refractive power S of 0.00 D, a circular cylindrical refractive power C of +2.00 D, a cylinder axis of 45 degrees, an addition power of 2.00 D and a lens-center thickness t of 3.3 mm.

Quite similarly to embodiment 1, reference lines were set up. As a Z-directional increase/decrease to/from the combined refracting surface coordinate value of the basic progressive refractive power along each reference line, tertiary and quartic aspheric coefficients for the aspheric equation are computed to determine an aspheric addition amount $\delta(\theta, r)$. Tertiary and quartic aspheric coefficients for the aspheric equation are determined by interpolation of between the reference lines, to determine aspheric addition amounts as to the regions between the reference lines.

Figure 5A:
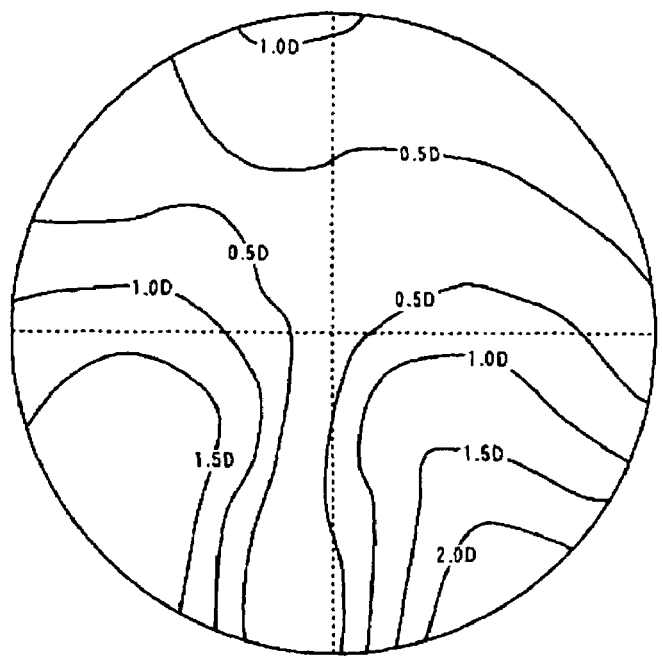
Figure 5B:
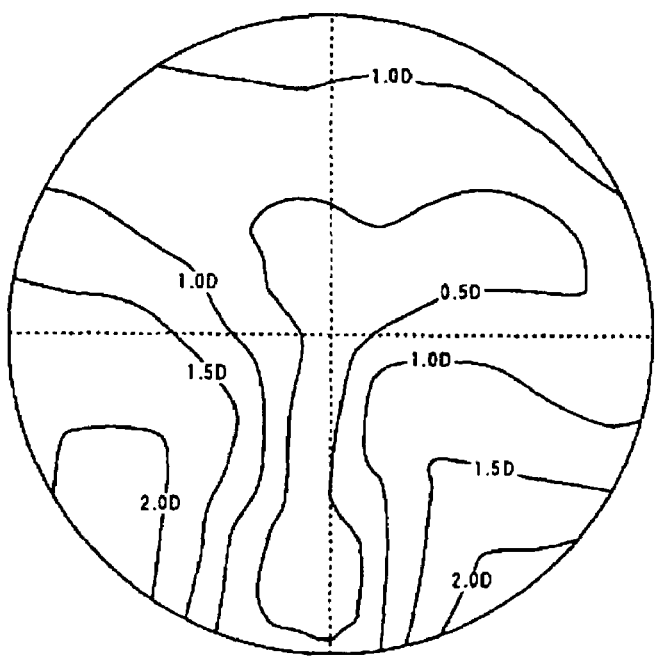
FIG. 5B is an iso-astigmatism diagram of a spectacle lens designed in the existing designing method.

Table 3 shows the data of aspheric coefficients $a_3(\theta)$, $a_4(\theta)$ and aspheric addition amounts $\delta(\theta, r)$ (in the units of μm) that is at an interval of 30 degrees. FIG. 5A shows an iso-astigmatism diagram due to a simulation conducted on an assumption in a state the spectacle lens designed in embodiment 3 is worn. Meanwhile, FIG. 5B shows an iso-astigmatism diagram due to a simulation conducted on an assumption in a state wearing spectacle lens with addition of an aspheric surface by applying the designing method shown in JP-A-2000-66148 to the identical original spectacle lens.

TABLE 3

| $r_{(mm)}$ | $\theta_{(deg)}$ | | | | | | |
|---|---|---|---|---|---|---|---|
| | 0 | 30 | 60 | 90 | 120 | 150 | 180 |
| $a_3(\theta)$ | 1.65E−06 | 2.77E−06 | 3.57E−06 | 1.06E−06 | −1.03E−06 | −4.87E−07 | 2.25E−06 |
| $a_4(\theta)$ | 4.01E−09 | 1.36E−08 | 4.67E−09 | −1.35E−08 | −2.65E−08 | −1.79E−08 | −1.24E−08 |
| 0 | 0.0 | 0.0 | 0.0 | 0.0 | 0.0 | 0.0 | 0.0 |
| 1 | 0.0 | 0.0 | 0.0 | 0.0 | 0.0 | 0.0 | 0.0 |
| 2 | 0.0 | 0.0 | 0.0 | 0.0 | 0.0 | 0.0 | 0.0 |
| 3 | 0.0 | 0.0 | 0.0 | 0.0 | 0.0 | 0.0 | 0.0 |
| 4 | 0.0 | 0.0 | 0.0 | 0.0 | 0.0 | 0.0 | 0.0 |
| 5 | 0.0 | 0.0 | 0.0 | 0.0 | 0.0 | 0.0 | 0.0 |
| 6 | 0.0 | 0.0 | 0.0 | 0.0 | 0.0 | 0.0 | 0.0 |
| 7 | 0.0 | 0.1 | 0.0 | 0.0 | −0.1 | 0.0 | 0.0 |
| 8 | 0.0 | 0.1 | 0.0 | 0.0 | −0.1 | −0.1 | 0.0 |
| 9 | 0.0 | 0.1 | 0.1 | −0.1 | −0.2 | −0.1 | −0.1 |
| 10 | 0.1 | 0.2 | 0.1 | −0.1 | −0.3 | −0.2 | −0.1 |
| 11 | 0.1 | 0.2 | 0.1 | −0.2 | −0.4 | −0.3 | −0.2 |
| 12 | 0.1 | 0.3 | 0.1 | −0.3 | −0.6 | −0.4 | −0.2 |
| 13 | 0.1 | 0.4 | 0.2 | −0.4 | −0.8 | −0.5 | −0.3 |
| 14 | 0.2 | 0.6 | 0.2 | −0.5 | −1.0 | −0.7 | −0.4 |
| 15 | 0.2 | 0.7 | 0.3 | −0.7 | −1.4 | −0.9 | −0.6 |
| 16 | 0.3 | 0.9 | 0.4 | −0.9 | −1.8 | −1.2 | −0.8 |
| 17 | 0.4 | 1.2 | 0.5 | −1.1 | −2.2 | −1.5 | −1.0 |
| 18 | 0.5 | 1.5 | 0.6 | −1.4 | −2.8 | −1.9 | −1.3 |
| 19 | 0.6 | 1.8 | 0.7 | −1.7 | −3.5 | −2.3 | −1.6 |
| 20 | 0.7 | 2.2 | 0.8 | −2.1 | −4.3 | −2.9 | −1.9 |
| 21 | 0.8 | 2.7 | 1.0 | −2.6 | −5.2 | −3.5 | −2.4 |
| 22 | 1.0 | 3.2 | 1.2 | −3.1 | −6.2 | −4.2 | −2.8 |
| 23 | 1.2 | 3.9 | 1.4 | −3.8 | −7.4 | −5.0 | −3.4 |
| 24 | 1.4 | 4.6 | 1.6 | −4.5 | −8.8 | −6.0 | −4.0 |
| 25 | 1.6 | 5.4 | 1.9 | −5.2 | −10.4 | −7.0 | −4.8 |
| 26 | 1.9 | 6.3 | 2.2 | −6.1 | −12.2 | −8.2 | −5.6 |
| 27 | 2.2 | 7.3 | 2.6 | −7.1 | −14.1 | −9.5 | −6.5 |
| 28 | 2.5 | 8.4 | 3.0 | −8.3 | −16.3 | −11.0 | −7.5 |
| 29 | 2.9 | 9.7 | 3.4 | −9.5 | −18.8 | −12.7 | −8.7 |
| 30 | 3.3 | 11.1 | 3.9 | −10.9 | −21.5 | −14.5 | −9.9 |

| $r_{(mm)}$ | $\theta_{(deg)}$ | | | | | |
|---|---|---|---|---|---|---|
| | 210 | 240 | 270 | 300 | 330 | 360 |
| $a_3(\theta)$ | 5.76E−06 | 7.20E−06 | 4.62E−06 | 2.85E−06 | 1.80E−06 | 1.65E−06 |
| $a_4(\theta)$ | −2.02E−08 | −2.80E−08 | −2.69E−08 | −2.93E−08 | −1.52E−08 | 4.01E−09 |
| 0 | 0.0 | 0.0 | 0.0 | 0.0 | 0.0 | 0.0 |
| 1 | 0.0 | 0.0 | 0.0 | 0.0 | 0.0 | 0.0 |
| 2 | 0.0 | 0.0 | 0.0 | 0.0 | 0.0 | 0.0 |
| 3 | 0.0 | 0.0 | 0.0 | 0.0 | 0.0 | 0.0 |
| 4 | 0.0 | 0.0 | 0.0 | 0.0 | 0.0 | 0.0 |
| 5 | 0.0 | 0.0 | 0.0 | 0.0 | 0.0 | 0.0 |
| 6 | 0.0 | 0.0 | 0.0 | 0.0 | 0.0 | 0.0 |
| 7 | 0.0 | 0.0 | 0.0 | −0.1 | 0.0 | 0.0 |
| 8 | 0.0 | −0.1 | −0.1 | −0.1 | 0.0 | 0.0 |
| 9 | −0.1 | −0.1 | −0.1 | −0.2 | −0.1 | 0.0 |
| 10 | −0.1 | −0.2 | −0.2 | −0.3 | −0.1 | 0.1 |
| 11 | −0.2 | −0.3 | −0.3 | −0.4 | −0.2 | 0.1 |
| 12 | −0.3 | −0.5 | −0.5 | −0.6 | −0.3 | 0.1 |
| 13 | −0.5 | −0.7 | −0.7 | −0.8 | −0.4 | 0.1 |

TABLE 3-continued

| | | | | | | |
|---|---|---|---|---|---|---|
| 14 | −0.7 | −1.0 | −1.0 | −1.1 | −0.6 | 0.2 |
| 15 | −0.9 | −1.3 | −1.3 | −1.4 | −0.7 | 0.2 |
| 16 | −1.2 | −1.7 | −1.7 | −1.9 | −1.0 | 0.3 |
| 17 | −1.6 | −2.2 | −2.2 | −2.4 | −1.2 | 0.4 |
| 18 | −2.0 | −2.8 | −2.7 | −3.0 | −1.6 | 0.5 |
| 19 | −2.5 | −3.5 | −3.4 | −3.8 | −2.0 | 0.6 |
| 20 | −3.1 | −4.3 | −4.2 | −4.6 | −2.4 | 0.7 |
| 21 | −3.8 | −5.3 | −5.1 | −5.6 | −2.9 | 0.8 |
| 22 | −4.6 | −6.4 | −6.2 | −6.8 | −3.5 | 1.0 |
| 23 | −5.5 | −7.7 | −7.4 | −8.1 | −4.2 | 1.2 |
| 24 | −6.6 | −9.1 | −8.8 | −9.7 | −5.0 | 1.4 |
| 25 | −7.8 | −10.8 | −10.4 | −11.4 | −5.9 | 1.6 |
| 26 | −9.1 | −12.6 | −12.2 | −13.3 | −6.9 | 1.9 |
| 27 | −10.6 | −14.7 | −14.2 | −15.5 | −8.1 | 2.2 |
| 28 | −12.3 | −17.0 | −16.4 | −18.0 | −9.3 | 2.5 |
| 29 | −14.1 | −19.6 | −18.9 | −20.7 | −10.7 | 2.9 |
| 30 | −16.2 | −22.5 | −21.7 | −23.7 | −12.3 | 3.3 |

Referring to FIGS. 3 to 5, the spectacle-lens designing method shown in JP-A-2000-66148 is a spectacle-lens designing method that astigmatism is greater and inferior in optical capability because not taking account of a cylindrical power for a combined refracting surface where an astigmatism-correcting refracting surface is added to a progressive refracting surface.

Contrary to this, the spectacle-lens designing method of the invention is recognized to provide the optimal aspheric design for a combined refracting surface that astigmatic and progressive powers are combined together because of the capability of taking account of an cylindrical power to an aspheric design.

The spectacle-lens designing method of the invention is capable of designing a spectacle lens that improves the optical capability of correcting a progressive power lens for presbyopia and astigmatism at the same time.

What is claimed is:

1. A method of designing a spectacle lens having a combined refracting surface in at least one of two refracting surfaces at object and eye sides structuring the spectacle lens, the combined refracting surface having an astigmatism correcting toric surface combined with a progressive refracting surface having a distance-use area, a near-use area different in refractive power from the distance-use area and a progressive area having a refractive power progressively changing between those, the method comprising:

establishing reference lines extending in at least three of radial directions from a center point in a vicinity of a geometric center of the spectacle lens to any one of both ends of the distant-use area, the near-use area, and a center region;

establishing reference lines extending in at least one of radial directions from the center point of the spectacle lens to the other of the distant-use area and the near-use area;

determining an aspheric addition amount for a refractive power that is along each of the reference lines; and determining an aspheric addition amount, by interpolation, for a refractive power of between the reference lines, wherein provided that a coordinate system is defined, as viewing the combined refracting surface from front of spectacles being worn, with X-axis in a left-right direction, Y-axis in a vertical direction being a distance direction, Z-axis in a depth direction and the center point as $(x, y, z) = (0, 0, 0)$, to represent a coordinate forming a basis of the combined refracting surface as $z_p$ and the aspheric addition amount as $\delta$, then a coordinate $z_t$ of a combined refracting surface added with the aspheric addition amount is expressed as $z_t = z_p + \delta$.

2. A method of designing a spectacle lens having a combined refracting surface in at least one of two refracting surfaces at object and eye sides structuring the spectacle lens, the combined refracting surface having an astigmatism correcting toric surface combined with a progressive refracting surface having a distance-use area, a near-use area different in refractive power from the distance-use area and a progressive area having a refractive power progressively changing between those, the method comprising:

establishing reference lines extending in at least three of radial directions from a center point in a vicinity of a geometric center of the spectacle lens to any one of both ends of the distant-use area, the near-use area, and a center region;

establishing reference lines extending in at least one of radial directions from the center point of the spectacle lens to the other of the distant-use area and the near-use area;

determining an aspheric addition amount for a refractive power that is along each of the reference lines; and determining an aspheric addition amount, by interpolation, for a refractive power of between the reference lines, wherein provided that a coordinate system is defined, as viewing the combined refracting surface from front of spectacles being worn, with X-axis in a left-right direction, Y-axis in a vertical direction being a distance direction, Z-axis in a depth direction and the center point as $(x, y, z) = (0, 0, 0)$, to represent a radial inclination forming a basis of the combined refracting surface as $dz_p$ and a radial inclination determined from the aspheric addition amount as $d\delta$, then a radial inclination $dz_t$ of a combined refracting surface added with the aspheric addition amount is expressed as $dz_t = dz_p + d\delta$.

3. A method of designing a spectacle lens having a combined refracting surface in at least one of two refracting surfaces at object and eye sides structuring the spectacle lens, the combined refracting surface having an astigmatism correcting toric surface combined with a progressive refracting surface having a distance-use area, a near-use area different in refractive power from the distance-use area and a progressive area having a refractive power progressively changing between those, the method comprising:

establishing reference lines extending in at least three of radial directions from a center point in a vicinity of a geometric center of the spectacle lens to any one of both ends of the distant-use area, the near-use area, and a center region;

establishing reference lines extending in at least one of radial directions from the center point of the spectacle lens to the other of the distant-use area and the near-use area;

determining an aspheric addition amount for a refractive power that is along each of the reference lines; and determining an aspheric addition amount, by interpolation, for a refractive power of between the reference lines, wherein provided that a coordinate system is defined, as viewing the combined refracting surface from front of spectacles being worn, with X-axis in a left-right direction, Y-axis in a vertical direction being a distance direction, Z-axis in a depth direction and the center point as $(x, y, z) = (0, 0, 0)$, to represent a radial curvature forming a basis of the combined refracting surface as $c_p$ and a radial curvature determined from the aspheric addition amount as $c\delta$, then a radial curvature $c_t$ of a combined refracting surface added with the aspheric addition amount is expressed as $c_t = c_p + c\delta$.

4. A method of designing a spectacle lens having a combined refracting surface in at least one of two refracting surfaces at object and eye sides structuring the spectacle lens, the combined refracting surface having an astigmatism correcting toric surface combined with a progressive refracting surface having a distance-use area, a near-use area different in refractive power from the distance-use area and a progressive area having a refractive power progressively changing between those, the method comprising:

establishing reference lines extending in at least three of radial directions from a center point in a vicinity of a geometric center of the spectacle lens to any one of both ends of the distant-use area, the near-use area, and a center region;

establishing reference lines extending in at least one of radial directions from the center point of the spectacle lens to the other of the distant-use area and the near-use area;

determining an aspheric addition amount for a refractive power that is along each of the reference lines; and determining an aspheric addition amount, by interpolation, for a refractive power of between the reference lines, wherein provided that a coordinate system is defined, as viewing the combined refracting surface from front of spectacles being worn, with X-axis in a left-right direction, Y-axis in a vertical direction being a distance direction, Z-axis in a depth direction and the center point as $(x, y, z) = (0, 0, 0)$, to represent a coordinate forming a basis of the combined refracting surface as $z_p$ and a Koreinich coefficient determined from the aspheric addition amount as $c\delta$, then a coordinate $z_t$ of a combined refracting surface added with the aspheric addition amount is expressed, using $b_p$ defined in the following equation (1)

$$b_p = \frac{2z_p}{x^2 + y^2 + z_p^2}, \quad (1)$$

as the following equation (2)

$$z_t = \frac{(b_p + c\delta)r^2}{1 + \sqrt{1 - (b_p + c\delta)^2 r^2}} \quad (2)$$

(where r is a distance from the center point wherein it is expressed as $r = (x^2 + y^2)^{1/2}$).

5. A method of designing a spectacle lens having a combined refracting surface in at least one of two refracting surfaces at object and eye sides structuring the spectacle lens, the combined refracting surface having an astigmatism correcting toric surface combined with a progressive refracting surface having a distance-use area, a near-use area different in refractive power from the distance-use area and a progressive area having a refractive power progressively changing between those, the method comprising:

establishing reference lines extending in at least three of radial directions from a center point in a vicinity of a geometric center of the spectacle lens to any one of both ends of the distant-use area, the near-use area, and a center region;

establishing reference lines extending in at least one of radial directions from the center point of the spectacle lens to the other of the distant-use area and the near-use area;

determining an aspheric addition amount for a refractive power that is along each of the reference lines; and determining an aspheric addition amount, by interpolation, for a refractive power of between the reference lines, wherein provided that a coordinate system is defined, as viewing the combined refracting surface from front of spectacles being worn, with X-axis in a left-right direction, Y-axis in a vertical direction being a distance direction, Z-axis in a depth direction and the center point as $(x, y, z) = (0, 0, 0)$, to represent a coordinate forming a basis of the combined refracting surface as $z_p$ and a Koreinich coefficient determined from the aspheric addition amount as $k\delta$, (wherein $k\delta = -e^2$, e is an eccentricity), then a coordinate $z_t$ of a combined refracting surface added with the aspheric addition amount is expressed, using $b_p$ defined in the following equation (1)

$$b_p = \frac{2z_p}{x^2 + y^2 + z_p^2}, \quad (1)$$

as the following equation (3)

[Equation 2]

$$z_t = \frac{b_p r^2}{1 + \sqrt{1 - (1 + k\delta)b_p^2 r^2}} \quad (3)$$

~~(where r is a distance from the center point wherein it is expressed as $r=(x^2+y^2)^{1/2}$).~~

6. The method in claim 1, wherein the combined refracting surface is provided in a refracting surface at a side closer to the eye.

* * * * *